AUTOMATIC DYNAMIC DELAY EQUALIZER FOR REDUCING DISTORTION

Filed July 25, 1960 2 Sheets-Sheet 1

INVENTORS.
THEODORE M. STUMP
JOHN D. TORPIE
BY Robert L. Nathans
ATTORNEY

AUTOMATIC DYNAMIC DELAY EQUALIZER FOR REDUCING DISTORTION

Filed July 25, 1960 2 Sheets-Sheet 2

United States Patent Office 3,011,135

Patented Nov. 28, 1961

3,011,135

AUTOMATIC DYNAMIC DELAY EQUALIZER FOR REDUCING DISTORTION

Theodore M. Stump and John D. Torpie, Rochester, N.Y., assignors to General Dynamics Corporation, Rochester, N.Y., a corporation of Delaware Filed July 25, 1960, Ser. No. 44,997

9 Claims. (Cl. 333—16)

Figure 1:
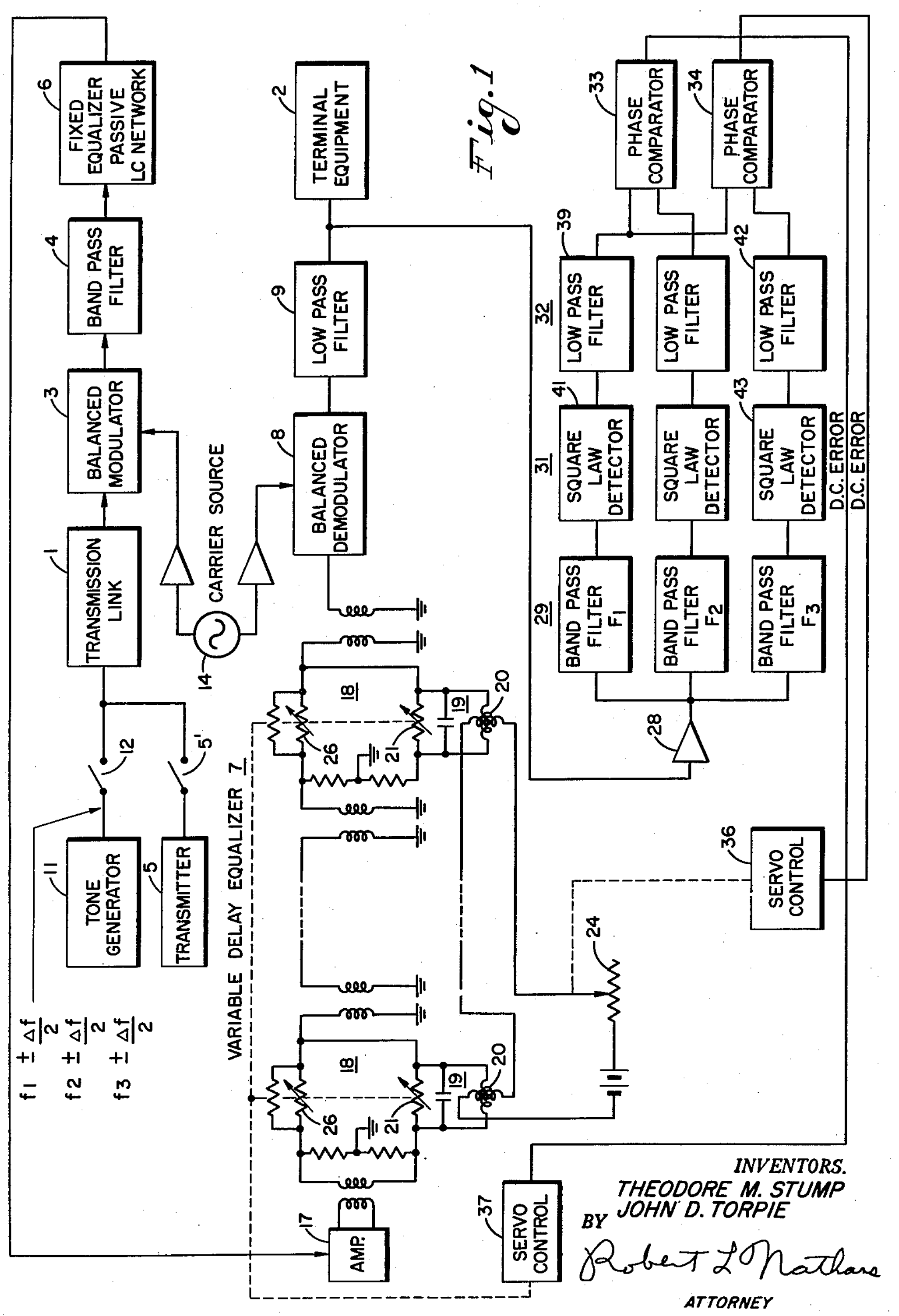

The present invention relates to delay equalizers.

Very often, electrical information is transmitted over a transmission link, which information contains numerous components having various frequencies. In order to prevent distortion, it is necessary that the envelope delay throughout the overall transmission system of all of these multifrequency components be substantially constant. In other words, the envelope delay vs. frequency curve should be a horizontal straight line. Since the envelope delay curve is the first derivative of the phase shift characteristic curve, it follows therefore that the phase shift vs. frequency curve should be a straight line in order to reduce distortion to a minimum. In certain applications, the transmitter for transmitting these multifrequency components is sequentially coupled to a number of different transmission links, each of which may have an envelope delay curve of unique shape. Since the envelope delay vs. frequency curve of the overall system should be a horizontal line in the ideal case, and since the envelope delay curve of a particular transmission link may be parabolic, a delay equalizer is often introduced in tandem with the transmission link, the equalizer having an envelope delay curve which is the mirror image of the delay curve of the transmission link so that the curves may be added together to produce an overall system envelope delay curve which is a horizontal line, as required to reduce distortion. These equalizers generally include resonant circuits which are adjusted manually before a particular link is utilized for transmission. Variable resistances, which are coupled to the resonant circuits, are also adjusted manually to change the Q of these circuits thereby to change the shape of the compensation delay curve. Each time the information transmitter is coupled to another information link, which generally possesses a delay curve having a different shape than the delay curve of the previously utilized transmission link, an operator must manually adjust the variable reactors and resistors of the equalization circuit so that a compensation delay curve is produced being a mirror image of the compensation delay curve of the particular transmission link about to be coupled to the information transmitter. This matching process generally involves the use of an oscilloscope and is tedious and time consuming. In addition, the equalizers of the prior art generally are made to operate in the 500 to 3000 c.p.s. range and, accordingly, these equalizers require a plurality of staggered tuned sections. By operating in the 12.5 kc. to 15.5 kc. range, for instance, these staggered tuned sections may be eliminated.

Accordingly, it is a principal object of the present invention to provide a new and improved dynamic delay equalizer which operates automatically.

It is a further object of the present invention to provide a dynamic delay equalizer which eliminates staggered tuned sections.

Other objects and the attending advantages of the present invention will become more apparent from the following detailed description when taken together with the accompanying drawings, in which:

FIG. 1 discloses one embodiment of the dynamic delay equalizer, and

Figures 2, 3:
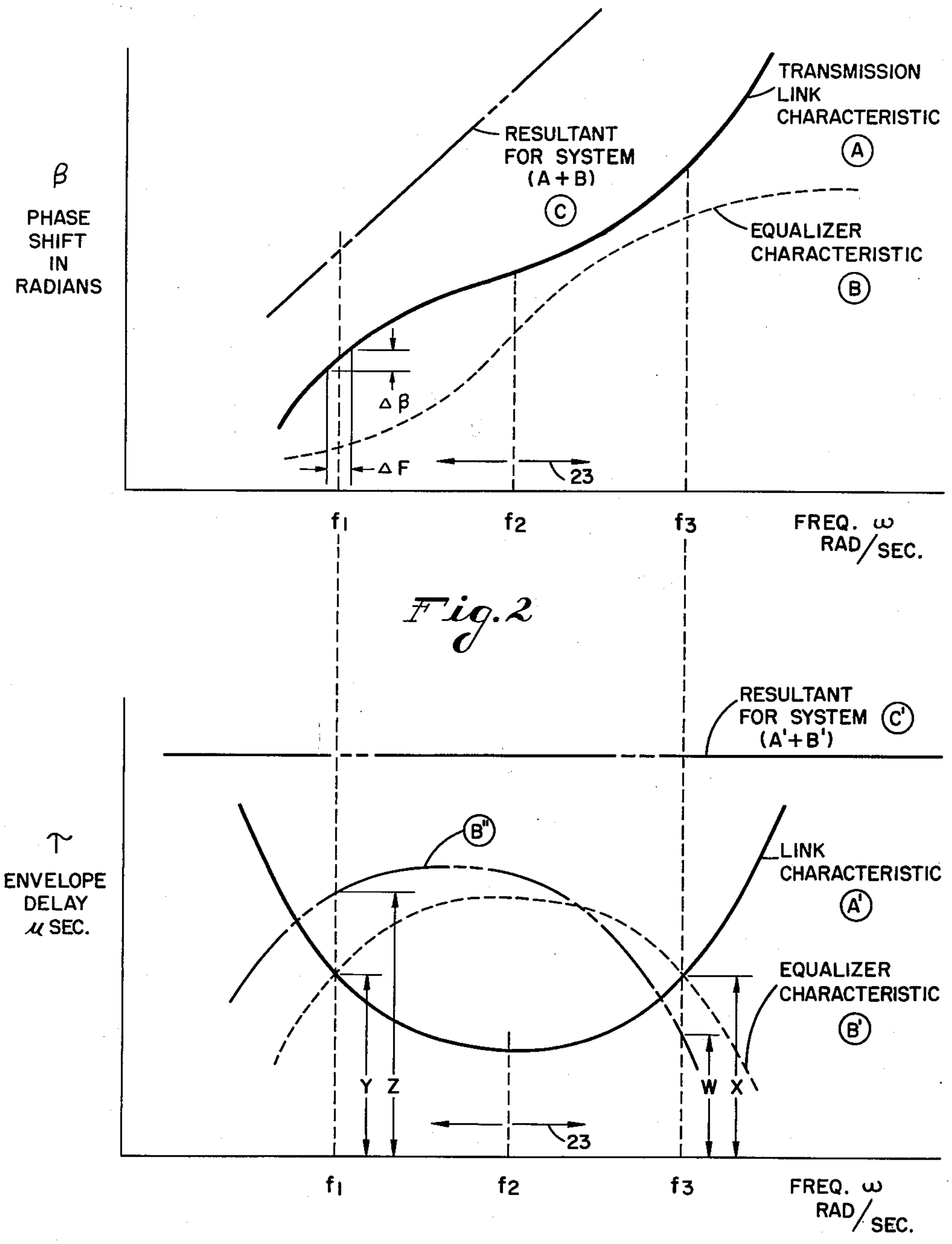

FIGS. 2 and 3 disclose curves which aid in the understanding of the operation of the system disclosed in FIG. 1.

FIG. 1 discloses a transmission link 1, which may be a radio link, a length of metallic conductor, or any other type of means for transmitting electrical information, coupled to a piece of terminal equipment 2, such as a telephone switchboard, through an ordinary balanced modulator 3, an ordinary bandpass filter 4, a fixed equalizer 6, which could be a passive LC network, variable delay equalizer 7, balanced demodulator 8, and low pass filter 9. Let it be assumed that the $\beta$ curve A, disclosed in FIG. 2, represents the phase shift in radians over a particular frequency range of the transmission link 1. Curve A is unsatisfactory, as discussed hereinbefore, since it is not a straight line as required by transmission theory. Accordingly, variable delay equalizer 7 is connected in tandem with transmission link 1 so that a $\beta$ curve B, which is the mirror image of $\beta$ curve A, may introduce delays so that these delays are added to the delays induced by the transmission link over a given frequency range thereby to produce curve C, as shown in FIG. 2, which is a straight line as required.

Since the $\beta$ curve of each transmission link will be somewhat different, it follows that the shape and position of $\beta$ curve B must be properly adjusted relative to $\beta$ curve A to attain the desired result. The feedback path, disclosed in FIG. 1, which utilizes servo mechanisms to alter the parameters of variable delay equalizer 7, automatically accomplishes the desired result without tedious manual manipulation of equalizer 7. FIG. 3 discloses the envelope delay curve which is the first derivative of the $\beta$ curve. The straight horizontal line C′ in FIG. 3 represents the constant slope of line C of FIG. 2 and it should be apparent that the shapes and positions of the curves of FIG. 3 will be changed together with the shapes and positions of the curves of FIG. 2, since the envelope delay curve is the first derivative of the $\beta$ curve.

Accordingly, it is necessary that variable delay equalizer 7 introduce delays represented by an envelope delay curve B′, which is the mirror image of curve A′ of FIG. 3, and in addition, it is necessary that curve B of FIG. 2 be the mirror image of curve A of that figure. Before the transmission link is coupled to transmitter 5 through switch 5′, a tone generator 11 is coupled to transmission link 1 through switch 12 and six frequencies are transmitted by tone generator 11 through transmission link 1. These frequencies may be represented by $$f1\frac{\pm\Delta f}{2},\ f2\frac{\pm\Delta f}{2},\ \text{and}\ f3\frac{\pm\Delta f}{2}$$

Ordinarily these frequencies are in the 500 through 3500 c.p.s. range. However, in order to avoid staggered tuning in the variable delay equalizer, the operating range is translated to the range of 14–17 kc. for instance. If desired, staggered tuning may readily be employed in this frequency range since shifts in resonant frequency of the tandemly connected resonant circuits do not affect the Q of these circuits, unlike operating in the 500–3000 c.p.s. range. As a result, one control suffices to shift the compensation delay curve without changing its shape. This is an important aspect of the present invention. This translation process is accomplished by means of carrier source 14 and balanced modulator 3 in the conventional manner. Bandpass filter 4 is utilized to select the lower or upper sideband which sideband is thereafter introduced into amplifier 17 coupled to the input circuit of variable delay equalizer 7. Fixed equalizer 6 may be merely a passive LC network which introduces a fixed envelope delay curve which is the mirror image of the envelope delay curve of bandpass filter 4 thereby to eliminate any variation in envelope delay introduced by this filter. Variable delay equalizer 7 comprises one or more tandemly connected sections 18, each of which includes a tank circuit 19 having a variable inductor 20 and a potentiometer 21 coupled across tank circuit 19. Variable inductors 20 have iron cores so that as the current flowing through the control windings are altered, the value of the inductances are altered thereby to change the resonant frequency of tank circuits 19. The result of changing the resonant frequencies of tank circuits 19 is to shift the vertical axis of the curves of FIGS. 2 and 3. This shift is represented by the horizontal arrows of these figures. It should, therefore, be understood that changes in the setting of variable resistance 24 will cause corresponding changes in the resonant frequency of the tank circuit of each section 18 and, accordingly, the composite curves are shifted either to the left or to the right, as required. In order to change the shapes of curves B and B′ to produce the mirror image of curves A and A′, variable resistors 21 and 26 are provided. Variations in the settings of these resistors will change the Q of the associated resonant circuits thereby to change the shapes of curves B and B′.

The modulated carrier, which is produced in the output circuit of variable delay equalizer 7, is demodulated by balanced demodulator 8, which could be a "ring type" modulator. Lowpass filter 9 introduces the appropriate sideband to terminal equipment 2 and through amplifier 28 to the set of bandpass filters 29, as disclosed in FIG. 1. Each bandpass filter 29 is coupled through one of the set of square-law detectors 31 and through one of the lowpass filters 32 to the phase comparators 33 and 34, as shown in the figure. The output circuit of phase comparator 34 is coupled to any conventional servo mechanism 36 which responds to a difference voltage produced in the output circuit of phase comparator 34. A voltage difference signal of one polarity produced by phase comparator 34 will cause the setting of the variable resistance 24 to be changed in one direction and a voltage difference signal having an opposite polarity will cause the setting of the variable resistance 24 to be altered in an opposite direction. Such servo control mechanisms are old and well known in the art and, accordingly, detail has been omitted. Servo control circuit 37 causes changes in the settings of variable resistors 21 and 26.

The purpose of the feedback loop which includes phase comparators 33 and 34 and servo mechanism control circuitry 36 and 37 is to induce changes in the settings of the components of the variable delay equalizer 7 so that the envelope delay curve of delay equalizer 7 is made to become the mirror image of the envelope delay curve of transmission link 1, which tends to minimize distortion as discussed hereinbefore. When switch 12 is closed, tone generator 11 causes six frequencies to pass through the transmission link 1 to test the envelope delay characteristic of the link. It may be that the $\beta$ curve B and the envelope delay curve B′ is shifted horizontally with respect to the $\beta$ curve A of the transmission link and the envelope delay A′ of the transmission link. This has been briefly mentioned hereinabove and the phenomenon is schematically represented by the arrows 23 in FIGS. 2 and 3. The test frequencies are selected so that the slope of the envelope delay curve at *f*1 should equal the slope of the envelope delay curve of *f*3 after the compensation process has been completed. Let us assume that the envelope delay curve of the variable delay equalizer 7 conforms to B″ of FIG. 3 and that the link delay characteristic curve is represented by A′. Under these conditions, it is necessary that changes be induced in equalizer 7 to shift the B″ curve to the right so that it is symmetrical with respect to the A′ curve. This shift, as mentioned hereinbefore, is controlled by varying the setting of variable resistor 24 thereby to change the resonant frequencies of the tank circuits of equalizer 7. The purpose of the feedback loop is to determine in which direction B″ is to be shifted and to what extent. As mentioned hereinbefore, the amplitude of any particular envelope delay curve at any particular point is proportional to the first derivative of the associated $\beta$ curve at that same point. It may be seen by inspection that the total system envelope delay at *f*1 is equal to $Y+Z$ and the total system envelope delay at *f*3 is proportional to $W+X$. This means that the system envelope delay at *f*1 is considerably greater than the system envelope delay at *f*3. It should be apparent that as B″ tends to become centered with respect to A′, the system envelope delay at *f*1 will tend to become equal with respect to the system envelope delay at *f*3. When this occurs, the shifting of B″ will cease and the equalizer delay characteristic curve will now be centered with respect to the link delay characteristic curve as represented by B′ in FIG. 3.

The circuitry of the present invention compares $Y+Z$ with $X+W$ by inspecting the slopes of the $\beta$ curve for the system represented by C in FIG. 2 at *f*1 and *f*3. It is assumed that B′ is symmetrical to A′ when the slope of the $\beta$ curve at *f*1 is equal to the slope of the $\beta$ curve at *f*3 since this is a condition fulfilled by the state of symmetry between the two curves. The purpose of the square-law detectors is to produce signals having phases proportional to the slopes of the $\beta$ curve at various points. It is demonstrated below that the process of introducing a signal of the form $$f1\frac{\pm\Delta f}{2}$$

into the input circuit of an associated square-law detector will produce a signal in the output circuit of the square-law detector having a phase which is proportional to the slope of the $\beta$ curve at *f*1. This may be shown as follows:

Input to transmission link $=f_1\pm\frac{\Delta F}{2}$ $$=E\sin\omega_1 t+E\sin\omega_2 t \qquad (1)$$

Input to square-law detector $$=E\sin(\omega_1 t-\beta_1+E\sin(\omega_2 t-\beta_2)$$

Output of square-law detector (2)

$$=[E\sin(\omega_1 t-\beta_1)+E\sin(\omega_2 t-\beta_2)]^2$$
$$=\sin^2(\omega_1 t-\beta_1)+\sin^2(\omega t-\beta\ )$$
(Ignoring E)
$$+\sin[(\omega_1+\omega_2)t-\beta_1-\beta_2]$$
$$+\sin[(\omega_2-\omega_1)t-(\beta_2-\beta_1)]$$

Input to phase comparator (3)

$$=\sin[\Delta\omega t-\Delta\beta]$$ (latter term selected by L.P.F.)

where $\Delta\omega=\omega_2-\omega_1$ $$\Delta\beta=\beta_2-\beta_1$$
$$=\sin\Delta\omega\left(t-\frac{\Delta\beta}{\Delta\omega}\right)$$

(Envelope delay) $\tau=\frac{\Delta\beta}{\Delta\omega}$ $\therefore \tau \alpha$ phase of wave represented by Eq. (3).

As mentioned hereinbefore, it is necessary that the slope of the $\beta$ curve at *f*1 be equal to the slope of the $\beta$ curve at *f*3 and that equalizer 7 be continuously adjusted until this condition is fulfilled, thereby to center the equalizer delay curve R″ with respect to the link delay characteristic curve A′. Lowpass filter 39 couples the output circuit of square-law detector 41 into a first input terminal of phase comparator 34 and lowpass filter 42 couples the output circuit of square-law detector 43 to a second input terminal of phase comparator 34. Since the phase of the signal produced at the first input terminal of phase comparator 34 is proportional to the slope of the $\beta$ curve at *f*1 and since the phase of the signal produced at the second input terminal of phase comparator 34 is proportional to the slope of the $\beta$ curve at *f*3, it follows that the strength and polarity of the different signal produced in the output circuit of phase comparator 34 is proportional to the degree of asymmetry of curve B″ with respect to A′. This difference signal is introduced into the input circuit of any conventional servo mechanism control means represented by 36. The setting of potentiometer 24 is continually changed in the appropriate direction thereby to continuously change the value of the inductors of the tank circuits of variable delay equalizer 7 which in turn shifts curve B'' horizontally. This shifting process continues until the difference signal is reduced to zero. If the working frequency range were 500–3000 c.p.s., the shifting process would cause a change in the shape of the compensation delay curve. This point is discussed hereinafter.

Once B' has been positioned symmetrically with respect to A', the shape of B' may have to be altered so that B' becomes the mirror image of A'. This condition will be assumed to exist when the slope of the $\beta$ curve of the system at $f1$ is equal to the slope of the $\beta$ curve of the system at $f2$.

A difference signal will be produced at the output circuit of phase comparator 33 where these slopes are different. This difference signal controls servo control circuit 37 to vary the settings of variable resistors 21 and 26 of variable delay equalizer 7 thereby to change the Q of each resonant circuit which in turn alters the shape of the equalizer characteristic curve. The adjustment will continue until the slope of the $\beta$ curve at $f1$ equals the slope of the $\beta$ curve at $f2$. The slope of the $\beta$ curve at all three points is now equal.

Accordingly, a feedback system is provided for automatically producing an envelope delay characteristic curve of a variable delay equalizer coupled in tandem with a particular transmission link, which curve is the mirror image of the envelope delay curve of the transmission link. Since the equalizer is connected in tandem with the transmission link, the delay curves are added so as to produce a horizontal line as represented by C' in FIG. 3. The horizontal line indicates that envelope delay is equal for all frequency components within a given range thereby to reduce distortion due to changes in envelope delay with frequency.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. A transmission system comprising, a transmission link which may not have an envelope delay characteristic which is substantially constant over a given frequency range, a variable delay equalizer coupled in tandem with said transmission link, means coupled to one end of said transmission link for transmitting a plurality of tones through said transmission link, means for generating a fluctuating carrier signal, means coupled to the other end of said transmission link for modulating said carrier signal with said tones, means for introducing the modulated carrier signal into said variable delay equalizer, means for examining the slope of the $\beta$ vs. $\omega$ characteristic curve of the transmission system at the points on said characteristic curve related to the frequencies of at least some of said tones where $\beta$ is the phase shift of the signal components passing through the transmission system and $\omega$ is the frequency of the signal components passing through the transmission system, means coupled to said means for examining for comparing the slope of said characteristic curve at one of said points with the slope of said characteristic curve at another of said points, means coupled to the output circuit of said means for comparing for controlling said variable delay equalizer and for continuously causing a change in the $\beta$ vs. $\omega$ characteristic curve of said variable delay equalizer as long as a difference signal is produced by said means for comparing so that the $\beta$ vs. $\omega$ characteristic curve of the transmission system tends to become substantially a straight line.

2. A transmission system comprising, a transmission link which may not have an envelope delay characteristic which is substantially constant over a given frequency range, a variable delay equalizer coupled in tandem with said transmission link, means coupled to one end of said transmission link for transmitting a first, second, and third tone through said transmission link, means for examining the slope of the $\beta$ vs. $\omega$ characteristic curve of the transmission system at first, second, and third points on said characteristic curve associated with the first, second, and third tones, where $\beta$ is the phase shift of the signal components passing through the transmission system and $\omega$ is the frequency of the signal components passing through the transmission system, first means for comparing the slope of said characteristic curve at said first point with the slope of said characteristic curve at said third point, second means for comparing the slope of said characteristic curve at said second point with the slope of said characteristic curve at one of said other points, first control means responsive to the production of a difference signal by said first means for comparing for shifting the vertical axis of the envelope delay curve of said variable delay equalizer until a difference signal is no longer produced by said first means for comparing, second control means having an input circuit coupled to the output circuit of said second means for comparing for altering the shape of the envelope delay characteristic curve of said variable delay equalizer until a difference signal is no longer produced by said second means for comparing so that the envelope delay characteristic curve of the transmission system tends to become substantially constant.

3. The combination as set forth in claim 2 wherein said means for examining includes a square-law detector.

4. The combination as set forth in claim 2 wherein said variable delay equalizer includes a resonant circuit having a variable reactor, means for changing the Q of said resonant circuit, and said first means for controlling includes means for changing the value of said variable reactor as long as a difference signal is produced by said first comparing means, and said second control means includes means for altering the parameter of said means for changing the Q of said resonant circuit as long as a difference signal is produced by said second comparing means.

5. The combination as set forth in claim 4 wherein said means for examining includes a square-law detector.

6. A transmission system comprising, a transmission link which may not have an envelope delay characteristic which is substantially constant over a given frequency range, a variable delay equalizer coupled in tandem with said transmission link, means coupled to one end of said transmission link for transmitting a plurality of tones through said transmission link, means for generating a fluctuating carrier signal, means coupled to the other end of said transmission link for modulating said carrier signal in accordance with said tones, means for introducing the modulated carrier signal into said variable delay equalizer, means for examining the slope of the $\beta$ vs. $\omega$ characteristic curve of the transmission system at the points on said characteristic curve related to the frequencies of at least some of said tones, where $\beta$ is the phase shift of the signal components passing through the transmission system and $\omega$ is the frequency of said signal components, means coupled to said means for examining for comparing the slope of said characteristic curve at one of said points with the slope of said characteristic curve at another of said points, means for controlling said variable delay equalizer so as to cause a change in the $\beta$ vs. $\omega$ characteristic curve of said variable delay equalizer as long as a difference signal is produced by said means for comparing so that the $\beta$ vs. $\omega$ characteristic curve of the transmission system tends to become substantially a straight line.

7. The combination as set forth in claim 6 wherein said variable delay equalizer includes a resonant circuit having a variable reactor and said means for controlling includes means for varying the reactance of said variable reactor.

8. The combination as set forth in claim 6 wherein said variable delay equalizer includes a resonant circuit having means associated therewith for varying the Q of said resonant circuit.

9. The combination as set forth in claim 6 wherein said means for examining the slope of the $\beta$ vs. $\omega$ curve includes a square-law detector.

References Cited in the file of this patent

UNITED STATES PATENTS

| | | |
|---|---|---|
| 2,719,270 | Ketchledge | Sept. 27, 1955 |
| 2,906,866 | Thompson | Sept. 29, 1959 |

UNITED STATES PATENT OFFICE

CERTIFICATION OF CORRECTION

Patent No. 3,011,135 November 28, 1961

Theodore M. Stump et al.

It is hereby certified that error appears in the above numbered patent requiring correction and that the said Letters Patent should read as corrected below.

Column 4, line 36, for "$=E \sin (\omega_1 t-\beta_1 + E \sin (\omega_2 t-\beta_2)$" read -- $=E \sin (\omega_1 t-\beta_1)+E \sin (\omega_2 t-\beta_2)$ --; line 39, for "$=\sin^2 (\omega_1 t-\beta_1)+ \sin^2(\omega t-\beta)$" read -- $=\sin^2(\omega_1 t-\beta_1)+ \sin^2(\omega_2 t-\beta_2)$ --.

Signed and sealed this 24th day of April 1962.

(SEAL)
Attest:

ESTON G. JOHNSON
Attesting Officer

DAVID L. LADD
Commissioner of Patents